(12) United States Patent
Kluckner et al.

(10) Patent No.: US 10,746,753 B2
(45) Date of Patent: Aug. 18, 2020

(54) METHODS AND APPARATUS FOR MULTI-VIEW CHARACTERIZATION

(71) Applicant: Siemens Healthcare Diagnostics Inc., Tarrytown, NY (US)

(72) Inventors: Stefan Kluckner, Berlin (DE); Yao-Jen Chang, Princeton, NJ (US); Terrence Chen, Princeton, NJ (US); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 104 days.

(21) Appl. No.: 16/072,412

(22) PCT Filed: Jan. 24, 2017

(86) PCT No.: PCT/US2017/014774
§ 371 (c)(1),
(2) Date: Jul. 24, 2018

(87) PCT Pub. No.: WO2017/132168
PCT Pub. Date: Aug. 3, 2017

(65) Prior Publication Data
US 2018/0364268 A1    Dec. 20, 2018

Related U.S. Application Data

(60) Provisional application No. 62/288,371, filed on Jan. 28, 2016.

(51) Int. Cl.
*G06K 9/00* (2006.01)
*G01N 35/00* (2006.01)
(Continued)

(52) U.S. Cl.
CPC ..... *G01N 35/00732* (2013.01); *G01B 11/245* (2013.01); *G01F 23/0076* (2013.01);
(Continued)

(58) Field of Classification Search
None
See application file for complete search history.

(56) References Cited

U.S. PATENT DOCUMENTS

| 7,611,839 B2 | 11/2009 | Twine et al. |
| 2007/0134131 A1 | 6/2007 | Watson et al. |

(Continued)

FOREIGN PATENT DOCUMENTS

| WO | 01/59708 A1 | 8/2001 |
| WO | 03/031954 A1 | 4/2003 |

(Continued)

OTHER PUBLICATIONS

PCT International Search Report and Written Opinion dated Apr. 10, 2017 (11 Pages).

(Continued)

*Primary Examiner* — Hadi Akhavannik

(57) ABSTRACT

A model-based method of classifying a specimen in a specimen container. The method includes capturing images of the specimen and container at multiple different exposures times, at multiple different spectra having different nominal wavelengths, and at different viewpoints by using multiple cameras. From the captured images, 2D data sets are generated. The 2D data sets are based upon selection of optimally-exposed pixels from the multiple different exposure images to generate optimally-exposed image data for each spectra. Based upon these 2D data sets, various components are classified using a multi-class classifier, such as serum or plasma portion, settled blood portion, gel separator (if present), tube, air, or label. From the classification data and 2D data sets, a 3D model can be generated. Specimen testing apparatus and quality check modules adapted to carry out the method are described, as are other aspects.

20 Claims, 8 Drawing Sheets

(51) Int. Cl.

| | | |
|---|---|---|
| *G01B 11/245* | (2006.01) | |
| *G06T 7/62* | (2017.01) | |
| *G06T 5/00* | (2006.01) | |
| *G06T 7/11* | (2017.01) | |
| *G01N 35/10* | (2006.01) | |
| *G01N 15/04* | (2006.01) | |
| *G06T 7/143* | (2017.01) | |
| *G06T 5/50* | (2006.01) | |
| *G01F 23/00* | (2006.01) | |
| *G06T 7/00* | (2017.01) | |
| *G01N 35/04* | (2006.01) | |
| *G01N 15/05* | (2006.01) | |

(52) U.S. Cl.
CPC ....... *G01N 15/042* (2013.01); *G01N 35/1016* (2013.01); *G06T 5/009* (2013.01); *G06T 5/50* (2013.01); *G06T 7/0012* (2013.01); *G06T 7/11* (2017.01); *G06T 7/143* (2017.01); *G06T 7/62* (2017.01); *G01N 2015/047* (2013.01); *G01N 2015/055* (2013.01); *G01N 2035/0401* (2013.01); *G01N 2035/0406* (2013.01); *G01N 2035/0493* (2013.01); *G01N 2035/1018* (2013.01); *G01N 2035/1025* (2013.01); *G06T 2207/10024* (2013.01); *G06T 2207/10036* (2013.01); *G06T 2207/10144* (2013.01); *G06T 2207/10152* (2013.01); *G06T 2207/20081* (2013.01); *G06T 2207/20084* (2013.01); *G06T 2207/20208* (2013.01); *G06T 2207/20221* (2013.01)

(56) References Cited

U.S. PATENT DOCUMENTS

| | | |
|---|---|---|
| 2010/0013983 A1 | 1/2010 | Ward et al. |
| 2011/0102542 A1 | 5/2011 | Chen et al. |
| 2011/0226045 A1* | 9/2011 | McQuillan ........... G01N 15/042 73/64.56 |
| 2012/0041722 A1 | 2/2012 | Quan et al. |
| 2012/0140230 A1 | 6/2012 | Miller |
| 2012/0309636 A1 | 12/2012 | Gibbons et al. |
| 2013/0044933 A1* | 2/2013 | Kenny ................. G01N 21/643 382/133 |
| 2013/0070992 A1 | 3/2013 | Metaxas et al. |
| 2013/0129166 A1* | 5/2013 | Muller .................. G01B 11/24 382/128 |
| 2014/0177932 A1 | 6/2014 | Milne et al. |
| 2014/0376791 A1 | 12/2014 | Heigl et al. |
| 2015/0054945 A1* | 2/2015 | Bangera ........... G01N 33/56938 348/135 |

FOREIGN PATENT DOCUMENTS

| | | |
|---|---|---|
| WO | 2011/044660 A1 | 4/2011 |
| WO | 2014/031576 A1 | 2/2014 |
| WO | 2014/140540 A1 | 9/2014 |

OTHER PUBLICATIONS

Extended EP Search Report dated Dec. 17, 2018 of corresponding European Application No. 17744779.4, 5 Pages.

* cited by examiner

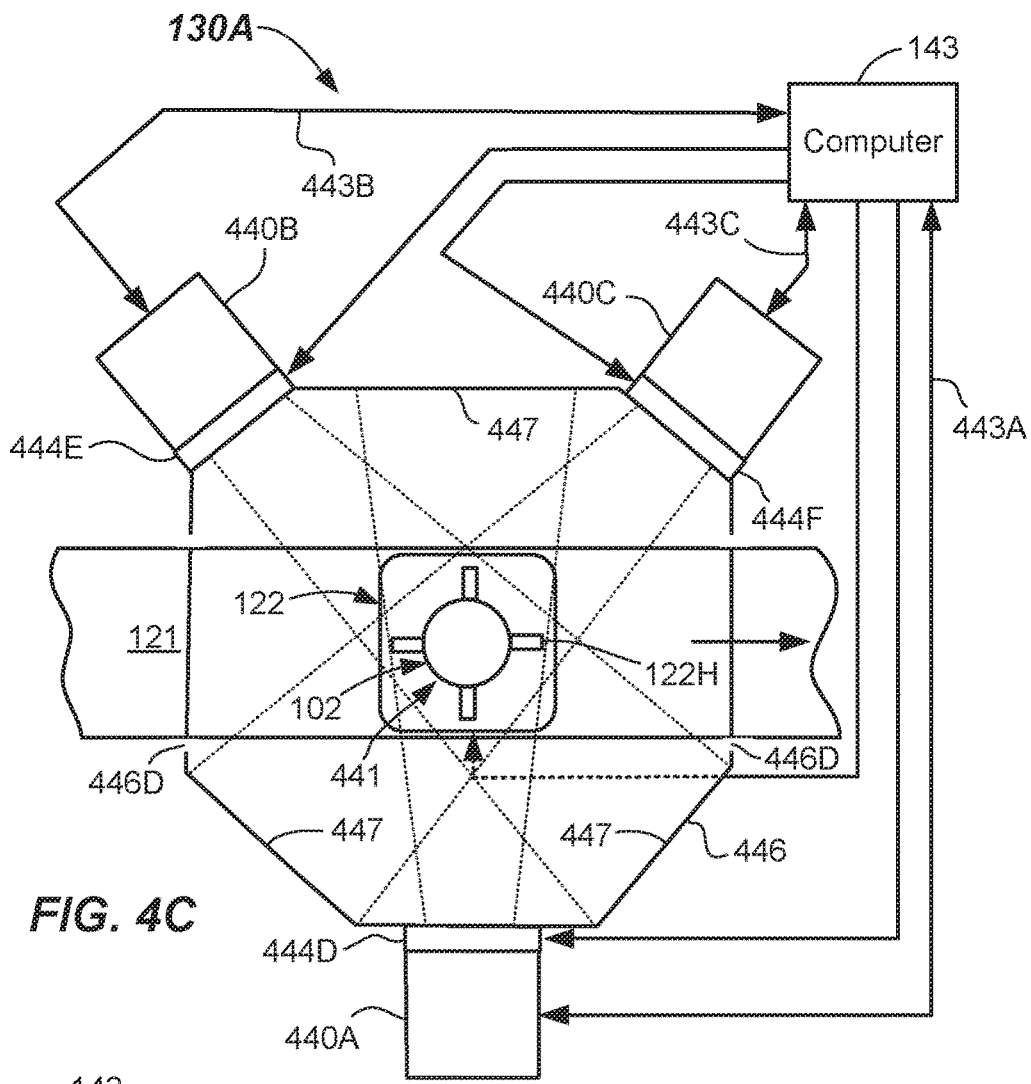
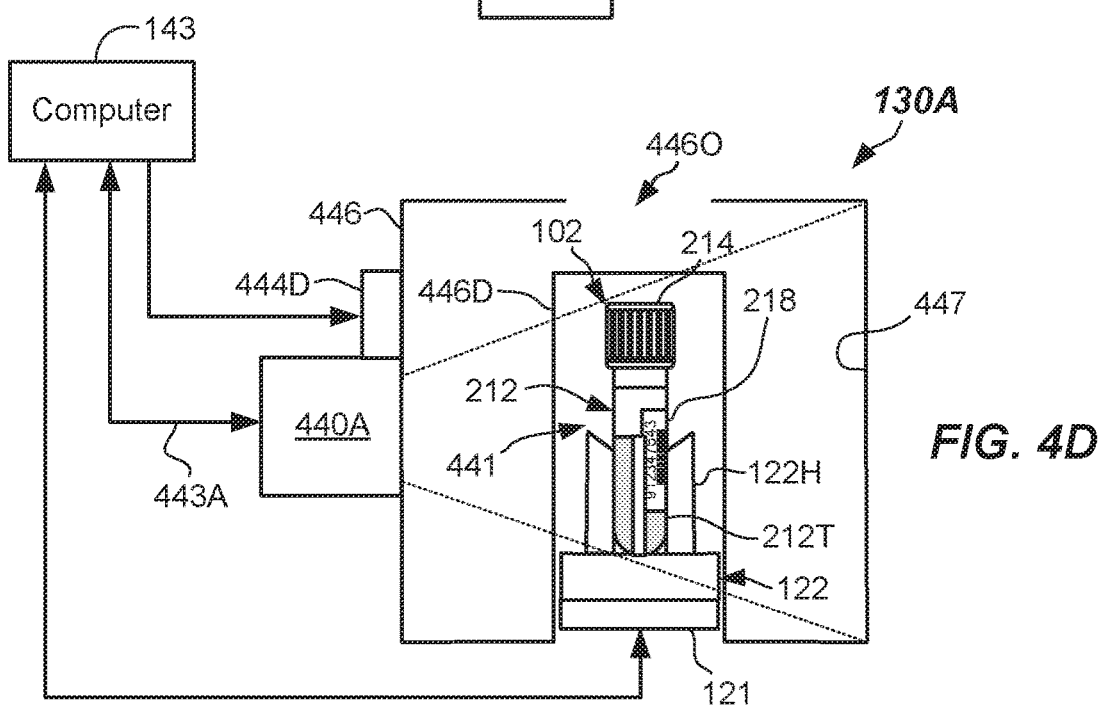
FIG. 4C
FIG. 4D

METHODS AND APPARATUS FOR MULTI-VIEW CHARACTERIZATION

RELATED APPLICATION

This application claims priority to U.S. Provisional Patent Application Ser. No. 62/288,371 entitled "METHODS AND APPARATUS FOR MULTI-VIEW CHARACTERIZATION" filed on Jan. 28, 2016, the disclosure of which is hereby incorporated by reference in its entirety herein.

FIELD

The present invention relates to methods and apparatus for testing of a specimen, and more particularly to methods and apparatus for imaging of the specimen and specimen container.

BACKGROUND

Automated testing systems may conduct clinical chemistry or assays using one or more reagents to identify an analyte or other constituent material in a specimen such as urine, blood serum, blood plasma, interstitial liquid, cerebrospinal liquids, and the like. For convenience and safety reasons, these specimens are almost always contained within specimen containers (e.g., specimen collection tubes). The test or assay reactions generate various changes that may be read and/or manipulated to determine a concentration of analyte or other constituent that is present in the specimen.

Improvements in automated testing technology have been accompanied by corresponding advances in pre-analytical sample preparation and handling operations such as batch preparation, centrifugation of sample containers to separate sample constituents, cap removal to facilitate fluid access, and the like by automated pre-analytical specimen preparation stations, which are part of Laboratory Automation Systems (LASs). LASs may automatically transport the specimens in specimen containers to a number of pre-analytical specimen processing stations and/or analytical stations containing clinical chemistry analyzers or assay instruments (hereinafter collectively referred to as "analyzers").

These LASs may handle any number of different specimens contained in barcode-labeled specimen containers. The barcode label may contain an accession number that may be correlated to demographic information that may be entered into a hospital's Laboratory Information System (LIS) along with test orders and possibly other information. An operator may place the labeled specimen containers onto the LAS system in racks, and the LAS may automatically route the sample containers for pre-analytical operations such as centrifugation, de-capping, and possibly aliquot preparation, and all prior to the specimen actually being subjected to clinical analysis or assaying by one or more analyzers that may also be part of the LAS.

For certain tests, a serum or plasma portion (e.g., obtained from whole blood by centrifugation) may be used. A gel separator may be added to the specimen container to aid in the separation of the settled blood portion from the serum or plasma portion. After centrifuging and a subsequent de-capping process, the specimen container may be transported to an appropriate analyzer that may extract serum or plasma portion from the specimen container and combine the serum or plasma portion with one or more reagents in a reaction vessel (e.g., cuvette or other vessel). Analytical measurements may then be performed, often using a beam of interrogating radiation, for example, or by using photometric or fluorometric absorption readings, or the like. The measurements allow determination of end-point or rate or other values, from which an amount of analyte or other constituent to be determined using well-known techniques.

In the prior art, the integrity of the serum or plasma portion of the specimen is visually inspected by a skilled laboratory technician. This may involve a review of the color thereof. A normal serum or plasma portion has a light yellow to light amber color, and may not include clots, bubbles, or foam. Specimens containing Hemolysis, Icterus, or Lipemia (H, I, or L) may be determined by comparing the specimen to known color standards. However, manual visual inspection is very subjective, labor intensive, and fraught with the possibility of human error.

Because manual visual inspection includes the problems listed above, it is becoming increasingly prevalent to evaluate the integrity of specimens without the use of visual inspection by a laboratory technician, but rather by using an automated inspection. However, in some instances, barcode labels adhered directly to the specimen container may partially occlude a view of the specimen, so that there may not be clear opportunity to visually observe the serum or plasma portion of the specimen.

In some systems, such as those described in US Pat. Pub. 2012/0140230 to Miller, the specimen container may be rotated at a quality station to find a view window that is unobstructed by the label. However, such systems may be less prone to ease of automation.

Because of problems encountered when trying to rotate specimens for imaging, there is an unmet need for a method and apparatus adapted to readily image a specimen container and specimen. The method and apparatus should not appreciably adversely affect the speed at which analytical or assaying test results are obtained. Furthermore, the method and apparatus should be able to be used even on labeled specimen containers, where the label occludes the view of some portion of the specimen.

SUMMARY

According to a first aspect, a method of characterizing a specimen contained within a sample container is provided. The method includes providing classified 2D data sets obtained by processing a plurality of 2D images of the specimen container containing a specimen taken from multiple viewpoints, the classified 2D data sets being classified as: serum or plasma, settled blood portion, gel separator (if present), air, tube, and label; correlating locations in the classified 2D data sets to a consolidated 3D data set; and forming a consolidated 3D model based upon the consolidated 3D data set.

According to another aspect, a quality check module adapted to characterize a specimen and specimen container is provided. The quality check module includes a plurality of cameras arranged around the specimen container and configured to capture multiple images of the specimen container and specimen from multiple viewpoints, each of the plurality of cameras adapted to generate a plurality of 2D images taken at multiple different exposure times and multiple different wavelengths or one or more wavelength ranges; and a computer coupled to the plurality of cameras and adapted to process image data from the plurality of 2D images, the computer configured and capable of being operated to: provide classified 2D data sets obtained by processing the plurality of 2D images taken from multiple viewpoints, the classified 2D data sets being classified as:

serum or plasma portion, settled blood portion, gel separator (if present), air, tube, and label; correlate locations in the 2D data sets to a consolidated 3D data set; and form a consolidated 3D model based upon the consolidated 3D data set.

In another aspect, a specimen testing apparatus adapted to image a specimen contained within a specimen container is provided. The testing apparatus includes a track; a carrier on the track configured to contain the specimen container; a plurality of cameras arranged around the track and configured to capture a plurality of 2D images of the specimen container and specimen from multiple viewpoints, each of the plurality of cameras configured to generate a plurality of images at multiple different exposure times and multiple different wavelengths or one or more wavelength ranges; a computer coupled to the plurality of cameras and adapted to process image data from the plurality of 2D images, the computer configured and capable of being operated to: provide classified 2D data sets obtained by processing the plurality of 2D images taken from the multiple viewpoints, the classified 2D data sets being classified as: serum or plasma portion, settled blood portion, gel separator (if present), air, tube, and label; correlate locations in the 2D data sets to a consolidated 3D data set; and form a consolidated 3D model based upon the consolidated 3D data set.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the appended claims.

BRIEF DESCRIPTION OF THE DRAWINGS

The drawings, described below, are for illustrative purposes only and are not necessarily drawn to scale. The drawings are not intended to limit the scope of the invention in any way.

FIG. 4C illustrates a schematic top view of a quality check module configured to take and analyze multiple images in order to quantify a specimen and specimen container according to one or more embodiments.

FIG. 4D illustrates a schematic side view of the quality check module of FIG. 4C according to one or more embodiments.

DETAILED DESCRIPTION

Figure 1:
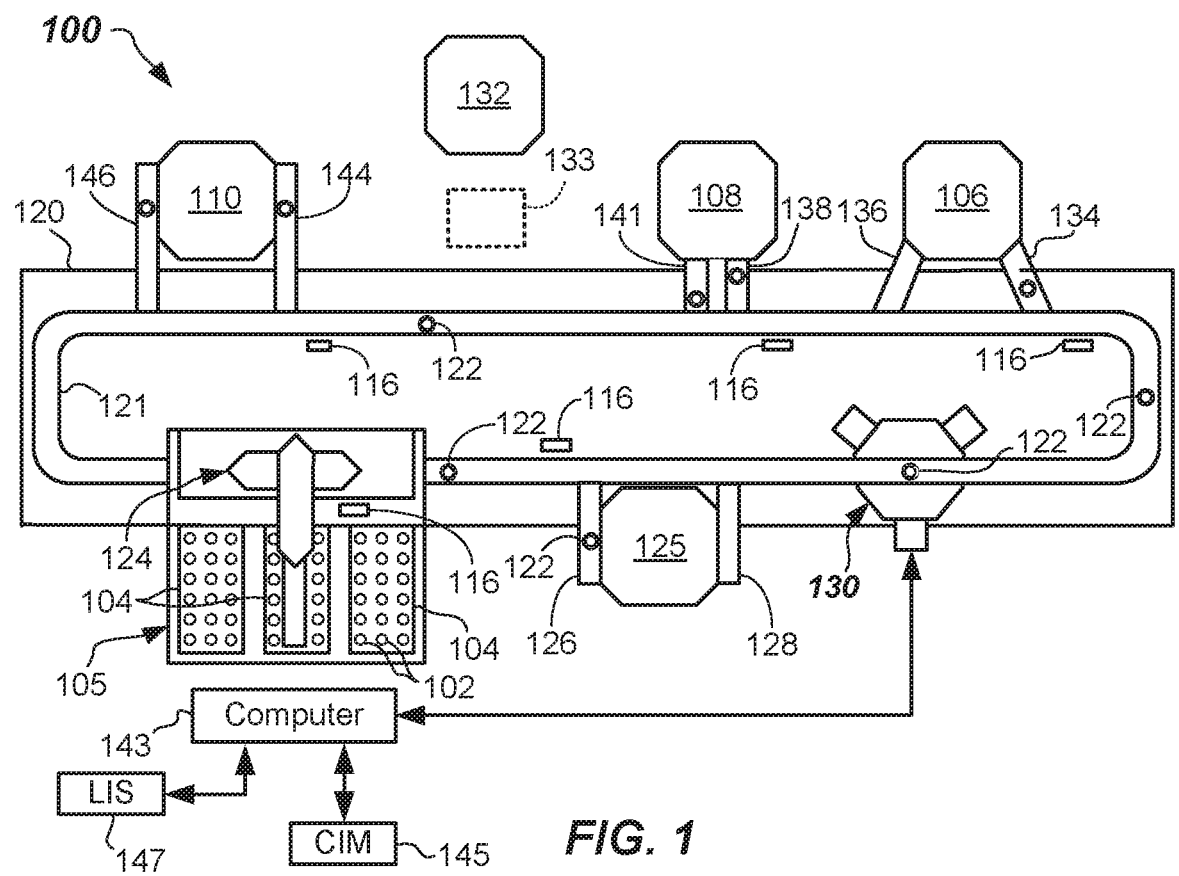
FIG. 1 illustrates a top schematic view of a specimen testing apparatus including one or more quality check modules and one or more analyzers according to one or more embodiments.

In a first broad aspect, embodiments of the present invention provide methods and apparatus adapted to image and to characterize a specimen contained in a specimen container. In one or more embodiments, the end result of the characterization method may be the generation of a 3D model of the specimen container containing the specimen. From the 3D model, information can be extracted to quantify the specimen and specimen container, determine characteristics of the specimen or specimen container, or may be used to verify conclusions drawn from 2D models generated from images taken at various lateral viewpoints. For example, dimensional characteristics of one or more components of the specimen and/or the specimen container may be determined. These dimensional characteristics may be used to properly guide the positioning of the probe (otherwise referred to as a "pipette"), during a subsequent aspiration and to prevent the probe from becoming contaminated by aspirating settled blood portion or gel separator (if used). In addition, the dimensional characteristics of the specimen container may be used to avoid contact or crashes of a robot gripper with the specimen container during specimen container maneuvers with the robot. Furthermore, the characterization may allow an amount of the serum or plasma portion to be accurately determined. Knowing the amount that is available allows more complete use of that portion, and allows for a check that there will be sufficient amount of serum or plasma portion present in the specimen container in order to carry tests, when multiple tests are ordered for that specimen.

Furthermore, the 3D model may be used for making a final determination of the presence of an interferent, such as the presence of hemolysis (H), icterus (I), and/or lipemia (L) in the serum or plasma portion of the specimen. Optionally, or in addition, the 3D model may be used for verifying the individual classification results from the respective 2D image data captured by multiple cameras at multiple viewpoints.

The specimen, as described herein, is collected in a specimen container, such as a blood collection tube and may include a settled blood portion and a serum and plasma portion after separation (e.g., fractionation using centrifugation). The settled blood portion is made up blood cells such as white blood cells (leukocytes), red blood cells (erythrocytes) and platelets (thrombocytes) which are aggregated and separated from the serum or plasma portion. It is generally found at the bottom part of the specimen container. The serum or plasma portion is the liquid component of blood that is not part of the settled blood portion. It is generally found above the settled blood portion. Plasma and serum differ primarily in the content of coagulating components, primarily fibrinogen. Plasma is the un-clotted liquid, whereas serum refers to blood plasma that has been allowed to clot, either under the influence of endogenous enzymes or exogenous components. In some specimen containers, a small gel separator (e.g. plug) may be used, which positions itself between the settled blood portion and the serum or plasma portion during fractionation. It serves as a barrier between the two portions.

In accordance with one or more embodiments, the characterization method may be carried out as a pre-analytical testing method. For example, in one or more embodiments, the characterization method may be carried out prior to the specimen being subjected to analysis (clinical chemistry or assaying) on one or more analyzers. In particular, one or more embodiments of the present invention provides for characterization of the specimen as a prerequisite for further testing. In one or more embodiments, the characterization of the specimen may be determined at one or more quality check modules including multiple cameras arranged to provide lateral 2D images of the specimen container from different lateral viewpoints. From this data, a consolidated 3D view of the specimen container and specimen may be constructed, without rotation of the specimen container.

The method according to one or more embodiments is carried out after a centrifuging procedure on the specimen. In particular, the characterization of the specimen and specimen container may be carried out using high dynamic range (HDR) image processing. The method may quantify the specimen, including the location of the interface boundaries of the serum or plasma portion and/or the settled blood portion, as well as the volume or depth of these components using HDR image processing.

The generated 2D data sets for the multiple viewpoints may be used to generate a 3D model that may be used to determine or verify information about the specimen, such as if any artifacts (e.g., clot, bubble, foam) are present in the serum or plasma portion, and/or determine whether an interferent, such as hemolysis, icterus, and/or lipemia (hereinafter "HIL") is present in the specimen.

In other embodiments, the 3D model may be used to identify or verify the dimensional or other characteristics of the specimen container, such as the container type (via identification of height and diameter thereof) of the specimen container, the cap type, and/or the cap color.

If after characterization, the serum or plasma portion is found to contain an artifact or one or more of H, I, or L, the specimen may be subjected to further processing. For example, an identified clot, bubble, or foam may be taken to another station (e.g., a remote station) for removal of the clot, bubble, or foam by an operator, or for further processing or characterization of indexes for H, I, or L. After such further processing, the specimen may be allowed, in some embodiments, to continue on and undergo routine analysis by the one or more analyzers. If the pre-screening finds that the specimen is normal (N), then the specimen may be directly routed to undergo routine analysis by one or more analyzers.

In one or more embodiments, one or more quality check modules are configured to carry out the data generation for constructing the 3D model. The one or more quality check modules may be provided as part of the LAS where a track transports the specimen to one or more analyzers, and the one or more quality check modules may be provided at any suitable location along the track. In a specific embodiment, a quality check module is provided on the track, such as at a loading station, so that the specimen and specimen container can be characterized while residing on the track.

The characterization may be accomplished using HDR data processing by capturing multiple images at the one or more quality check modules at multiple exposure times and at multiple wavelengths. The images may be obtained using multiple cameras arranged to take the images from different viewpoints. Processing of the one or more images at multiple wavelengths (e.g., colors) may be accomplished using different light sources. For example, white light sources, and/or red light sources, green light sources, and blue light sources may be used.

Images at multiple exposure times for each wavelength (or wavelength range) may be obtained at the one or more quality check modules. For example, 4-8 or more images at different exposure times may be obtained at each wavelength (or wavelength range). The exposure time may vary based on the lighting intensity and camera features. These multiple images may then be further processed by a computer to generate characterization results in 2D, which then may be consolidated in a 3D model. The consolidation into a 3D model may be based upon virtual voxels grids provided on the 2D data sets.

Further details of the inventive characterization methods, quality check modules, and specimen testing apparatus including one or more quality check modules will be further described with reference to FIGS. 1-7 herein.

Figure 2:
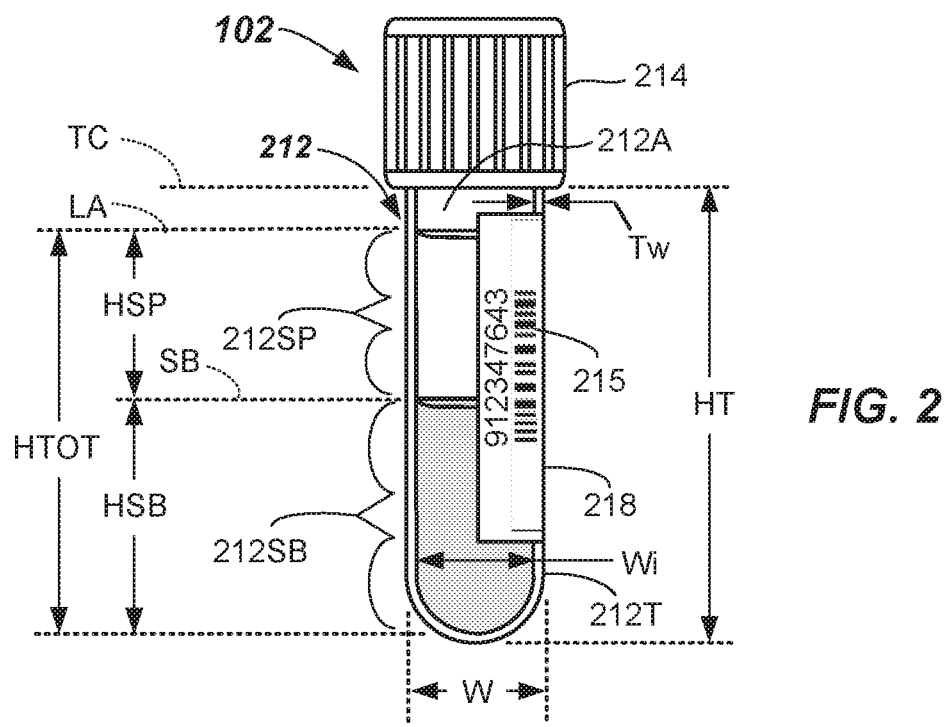
FIG. 2 illustrates a side view of a labeled specimen container including a specimen, both of which may be characterized using a method according to one or more embodiments.
Figure 3:
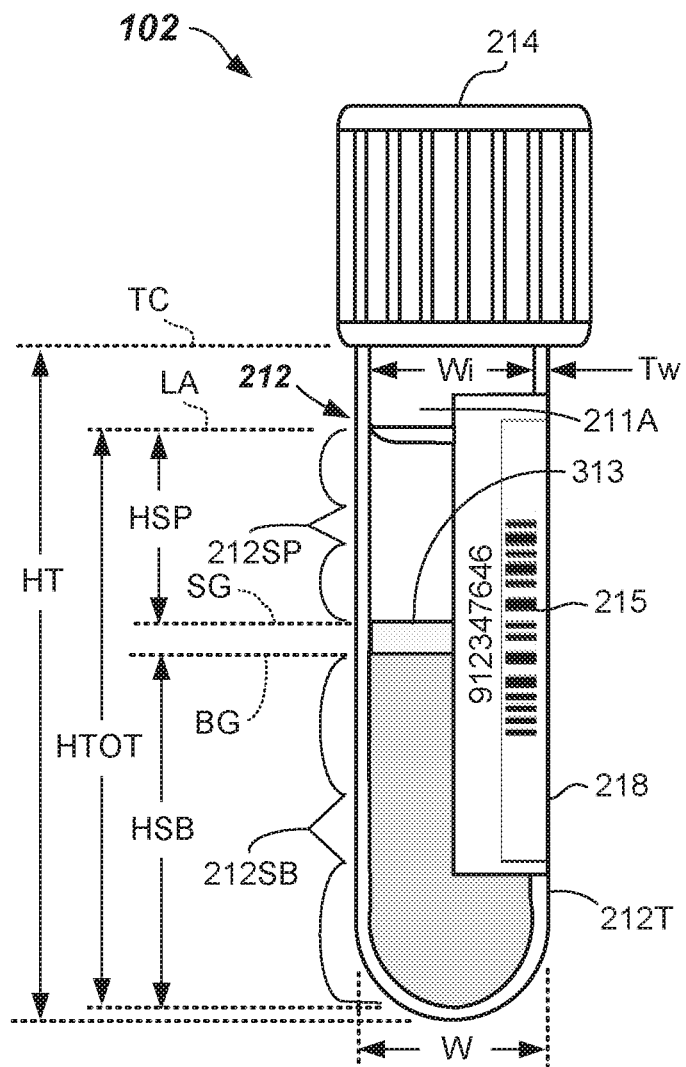
FIG. 3 illustrates a side view of a labeled specimen container including a specimen and a gel separator, which may be characterized using a method according to one or more embodiments.

FIG. 1 shows a specimen testing apparatus 100 capable of automatically processing multiple ones of the specimen containers 102 (e.g., specimen collection tubes—see FIGS. 2 and 3). The specimen containers 102 may be contained in one or more racks 104 at a loading area 105 prior to transportation to, and analysis by, one or more analyzers (e.g., first, second, and third analyzer 106, 108, 110, respectively, arranged about the specimen testing apparatus 100). It should be apparent that more or less numbers of analyzers can be used. The analyzers may be any combination of clinical chemistry analyzers and/or assaying instruments, or the like. The specimen containers 102 may be any generally transparent or translucent container, such as a blood collection tube, test tube, sample cup, cuvette, or other generally clear glass or plastic container configured to contain a specimen 212.

Typically, a specimen 212 (FIGS. 2 and 3) to be automatically processed may be provided to the specimen testing apparatus 100 in the specimen containers 102, which may be capped with a cap 214 (FIGS. 2 and 3—otherwise referred to as a "stopper"). The caps 214 may have different shapes and/or colors (e.g., red, royal blue, light blue, green, grey, tan, yellow, or combinations of multiple colors), which may have meaning in terms of what test the specimen container 102 is used for, the type of additive contained therein, or the like. Other colors may be used.

Each of the specimen containers 102 may be provided with identification information 215 (i.e., indicia), such as a barcode, alphabetic, numeric, alphanumeric, or combination thereof that may be machine readable at various locations about the specimen testing apparatus 100. The identification information 215 may indicate, or may otherwise be correlated, via a Laboratory Information System (LIS) 147, to a patient's identification as well as tests to be accomplished upon the specimen 212, or other information, for example. Such identification information 215 may be generally provided on a label 218 adhered to, or otherwise provided on the side of, the specimen container 102. The label 218 generally does not extend all the way around the specimen container 102, or all along a height of the specimen container 102. In some embodiments, multiple labels 218 may be adhered, and may slightly overlap each other. Accordingly, although the label 218 may occlude a view of some portion of the specimen 212, some portion of the specimen 212 may still be viewable from certain viewpoints. In some embodiments, the racks 104 may have additional identification information thereon.

As best shown in FIGS. 2 and 3, the specimen 212 may include a serum or plasma portion 212SP and a settled blood portion 212SB contained within the tube 212T. Air 212A may be provided above the serum and plasma portion 212SP and the line or demarcation between the air 212A and the serum and plasma portion 212SP is defined herein as the liquid-air interface (LA). The line of demarcation between the serum or plasma portion 212SP and the settled blood portion 212SB is defined herein as the serum-blood interface (SB), as is shown in FIG. 2. The interface between the air 212A and the cap 214 is referred to herein as the tube-cap interface (TC). The height of the serum or plasma portion 212SP is (HSP) and is defined as the height from the top of the serum or plasma portion 212SP to the top of the settled blood portion 212SB, i.e., from LA to SB in FIG. 2. The height of the settled blood portion 212SB is (HSB) and is defined as the height from the bottom of the settled blood portion 212SB to the top of the settled blood portion 212SB at SB in FIG. 2. HTOT in FIG. 2 is the total height of the specimen 212 and HTOT=HSP+HSB.

In cases where a gel separator 313 is used (see FIG. 3), the height of the serum or plasma portion 212SP is (HSP) and is defined as the height from the top of the serum or plasma portion 212SP at LA to the top of the gel separator 313 at SG, i.e., from LA to SG in FIG. 3. The height of the settled blood portion 212SB is (HSB) and is defined as the height from the bottom of the settled blood portion 212SB to the bottom of the gel separator 313 at BG in FIG. 3. HTOT in FIG. 3 is the total height of the specimen 212 and is defined as HTOT=HSP+HSB+height of the gel separator 313 as shown in FIG. 3. In each case, the wall thickness is Tw, the outer width is W, and the inner width of the specimen container 102 is Wi. The height of the tube (HT) is defined herein as the height from the bottom-most part of the tube 212T to the bottom of the cap 214.

In more detail, specimen testing apparatus 100 may include a base 120 (e.g., a frame or other structure) upon which a track 121 may be mounted or rest. The track 121 may be a railed track (e.g., mono or multiple rail tracks), a collection of conveyor belts, conveyor chains or links, moveable platforms, or any other suitable type of conveyance mechanism. Track 121 may be circular, serpentine, or any other suitable shape and may be a closed track (e.g., endless track) in some embodiments. Track 121 may, in operation, transport individual ones of the specimen containers 102 to destination locations spaced about the track 121 in carriers 122.

Carriers 122 may be passive, non-motored pucks that may be configured to carry a single specimen container 102 on the track 121, where the track 121 is moveable. Optionally, carrier 122 may be automated including an onboard drive motor, such as a linear motor that is programmed to move about the track 121 and stop at pre-programmed locations, where the track 121 is stationary. In either case, the carriers 122 may each include a holder 122H (FIGS. 4A-4D) configured to hold the specimen container 102 in a defined generally upright position. The holder 122H may include a plurality of fingers or leaf springs that secure the specimen container 102 in the carrier 122, but are laterally moveable or flexible to accommodate for different sizes of specimen containers 102 to be received therein. In some embodiments, carriers 122 may exit from the loading area 105 having one or more racks 104 staged thereat. In some embodiments, loading area 105 may serve a dual function of allowing offloading of the specimen containers 102 from the carriers 122 after analysis thereof is completed. Otherwise, a suitable offloading lane (not shown) may be provided elsewhere on the track 121.

A robot 124 may be provided at the loading area 105 and may be configured to grasp the specimen containers 102 from the one or more racks 104 and load the specimen containers 102 onto the carriers 122, such as on an input lane or other location of the track 121. Robot 124 may also be configured and operable to remove specimen containers 102 from the carriers 122 upon completion of testing. The robot 124 including one or more (e.g., at least two) robot arms or components capable of X and Z, Y and Z, X, Y, and Z, r and theta, or r, theta, and Z motion. Robot 124 may be a gantry robot, an articulated arm robot, an R-theta robot, or other suitable robot wherein the robot 124 may be equipped with robotic gripper fingers that may be sized to pick up and place the specimen containers 102.

Upon being loaded onto track 121, the specimen containers 102 carried by carriers 122 may, in some embodiments, progress to a centrifuge 125 (e.g., an automated centrifuge configured to carry out fractionation of the specimen 212). Carriers 122 carrying specimen container s102 may be diverted to the centrifuge 125 by inflow lane 126 or a suitable robot (not shown). After being centrifuged, the specimen containers 102 may exit on outflow lane 128, or otherwise be moved by the robot, and continue on the track 121. In the depicted embodiment, the specimen container 102 in carrier 122 may next be transported to a quality check module 130 to be further described herein with reference to FIGS. 4A and 4B.

The quality check module 130 is configured and adapted to characterize the specimen 212 contained in the specimen container 102 as well as adapted to characterize the specimen container 102. Quantification of the specimen 212 may take place at the quality check module 130 and may include determination of HSP, HSB, HTOT, and determination of location of SB, LA, SG, and/or BG). The quality check module 130 may also be configured for determining a presence of an interferent, such as one or more of hemolysis (H), icterus (I), and/or lipemia (L) contained in a specimen 212 to be processed by the specimen testing apparatus 100. In some embodiments, the specimen 212 may also be tested for the presence of an artifact (e.g., clot, bubble, or foam) at the quality check module 130. In some embodiments, quantification of the physical attributes of the specimen container 102 may take place at the quality check module 130 such as determining HT, cap color, cap type, TC, tube outer width (W), and tube inner width (Wi).

Once the specimen 212 is characterized, the specimen 212 may be pre-screened for artifacts, presence of an interferent, or the specimen container 102 may be further characterized, then the specimen 212 may be forwarded to be analyzed in the one or more analyzers (e.g., first, second and third analyzers 106, 108, and/or 110) before returning each specimen container 102 to the loading area 105 for offloading.

Additionally, a remote station 132 may be provided on the specimen testing apparatus 100 even though the remote station 132 is not directly linked to the track 121. For instance, an independent robot 133 (shown dotted) may carry specimen containers 102 containing specimens 212 to the remote station 132 and return them after testing/processing. Optionally, the specimen containers 102 may be manually removed and returned. Remote station 132 may be used to test for certain constituents, such as a hemolysis level, or may be used for further processing, such as to lower a lipemia level through one or more additions, or to remove a clot, bubble or foam, for example. Other testing or processing may be accomplished on remote station 132. Furthermore, additional stations (not shown) may be arranged around the track 121 at various desirable locations, such as a de-capping station, or the like.

The specimen testing apparatus 100 may include a number of sensors 116 at one or more locations around the track 121. Sensors 116 may be used to detect a location of specimen containers 102 along the track 121 by means of reading the identification information 215 (FIG. 2) placed on the specimen container 102, or like information (not shown) that is provided on each carrier 122. In some embodiments, a barcode may be provided on the carrier 122, for example. Other means for tracking the location of the carriers 122 may be used, such as proximity sensors. All of the sensors 116 may interface with the computer 143 so that the location of each specimen container 102 may be appropriately known at all times.

Centrifuge 125 and each of the analyzers 106, 108, 110 may be generally equipped with robotic mechanisms and/or inflow lanes (e.g., inflow lanes 126, 134, 138, 144) configured to remove carriers 122 from the track 121, and robotic mechanisms and/or outflow lanes (e.g., outflow lanes 128, 136, 141 and 146) configured to reenter carriers 122 onto the track 121.

Specimen testing apparatus 100 may be controlled by the computer 143, which may be a microprocessor-based central processing unit (CPU), having a suitable memory and suitable conditioning electronics, drivers and software for operating the various system components. Computer 143 may be housed as part of, or separate from, the base 120 of the specimen testing apparatus 100. The computer 143 may operate to control movement of the carriers 122 to and from the loading area 105, motion about the track 121, and motion to and from the centrifuge 125, motion to and from the quality check module 130 as well as operation of the quality check module 130. Computer 143 or a separate computer may control operation of the centrifuge 125, and motion to and from each analyzer 106, 108, 110 as well as operation of each analyzer 106, 108, 110 for carrying out the various types of testing (e.g., assay or clinical chemistry).

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the quality check module 130 may also be provided by the computer 143, but according to an inventive model-based imaging method, as will be described in detail herein.

Embodiments of the present invention may be implemented using a computer interface module (CIM) 145 that allows a user to quickly access a variety of control screens and status display screens. These control and status screens may describe some or all aspects of a plurality of interrelated automated devices used for preparation and analysis of specimens 212. The CIM 145 may be employed to provide information about the operational status of a plurality of interrelated automated devices, as well as information describing the location of any specimen 212 as well as a status of tests to be performed on, or being performed on, the specimen 212. The CIM 145 may thus be adapted to facilitate interactions between an operator and the specimen testing apparatus 100. The CIM 145 may include a display screen adapted to display a menu including icons, scroll bars, boxes, and buttons through which the operator may interface with the specimen testing apparatus 100. The menu may comprise a number of function buttons programmed to display functional aspects of the specimen testing apparatus 100.

In FIGS. 2 and 3, specimen containers 102 including specimen 212 are shown. FIG. 2 illustrates a specimen 212 including the serum or plasma portion 212SP and the settled blood portion 212SB, without a gel separator. FIG. 3 illustrates a specimen 212 including the serum or plasma portion 212SP and the settled blood portion 212SB with a gel separator 313. Pre-screening the specimen 212 in accordance with one or more aspects of the invention allows accurate quantification of the relative amounts of the serum or plasma portion 212SP and the settled blood portion 212SB, a ratio there between, but also the physical vertical locations of LA, SB, SG, and the bottom-most part of specimen container 102. Quantification ensures that the specimen 212 can be stopped from progressing on to the one or more analyzers 106, 108, 110, if there is insufficient amount of serum or plasma portion 212SP available to carry out the ordered tests. In this way, inaccurate test results may be avoided.

Advantageously, the ability to accurately quantify the physical location of LA and SB or SG may minimize not only the possibility of aspirating air, but also minimize the possibility of aspirating either settled blood portion 212SB or gel separator 313 (if the gel separator 313 is present in the specimen container 102). Thus, clogging and contamination of the specimen aspirating probe used to aspirate serum or plasma portion 212SP for the analyzers 106, 108, 110 may be avoided or minimized in some embodiments.

Figure 4A:
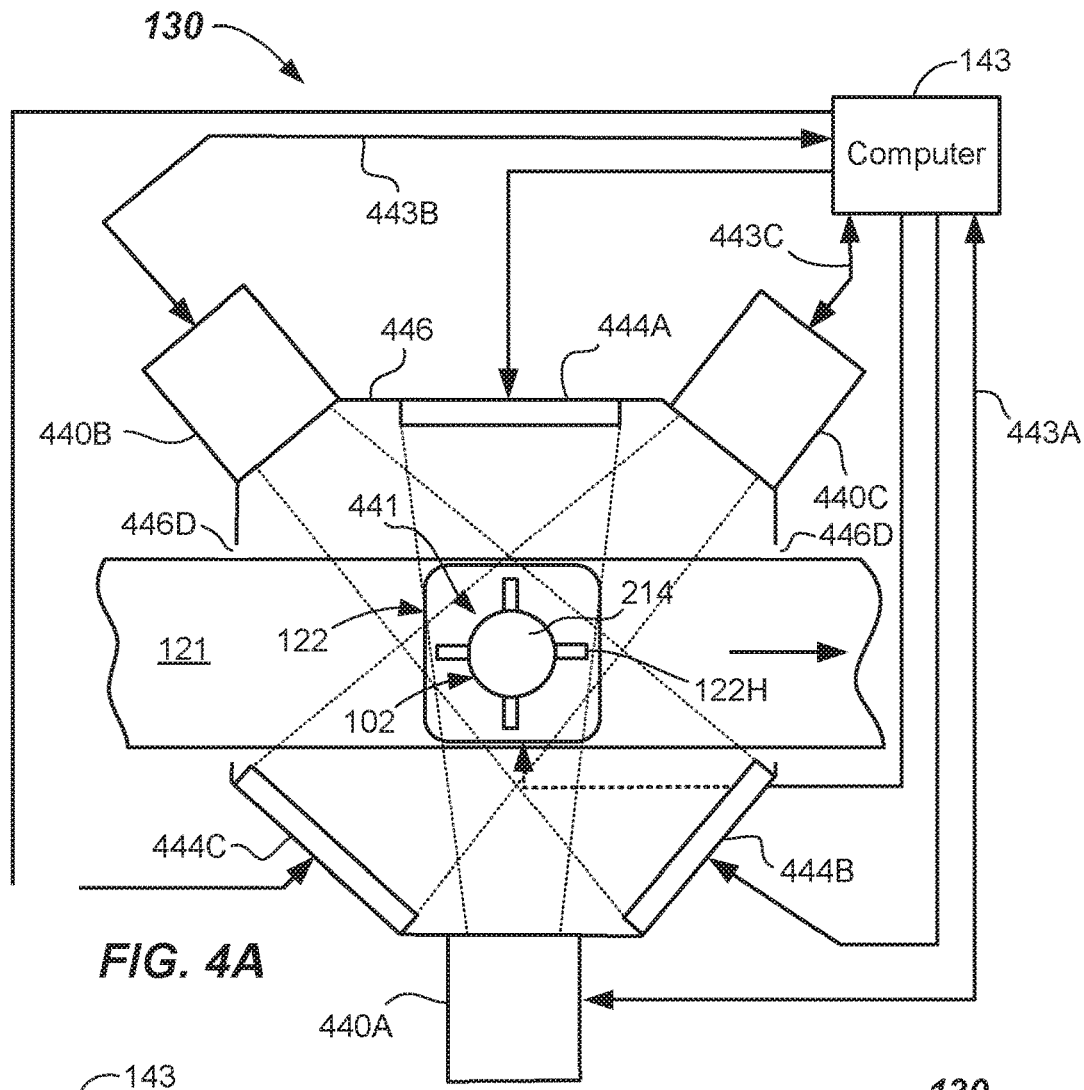
FIG. 4A illustrates a schematic top view of a quality check module configured to take and analyze multiple images in order to characterize a specimen and specimen container according to one or more embodiments.
Figure 4B:
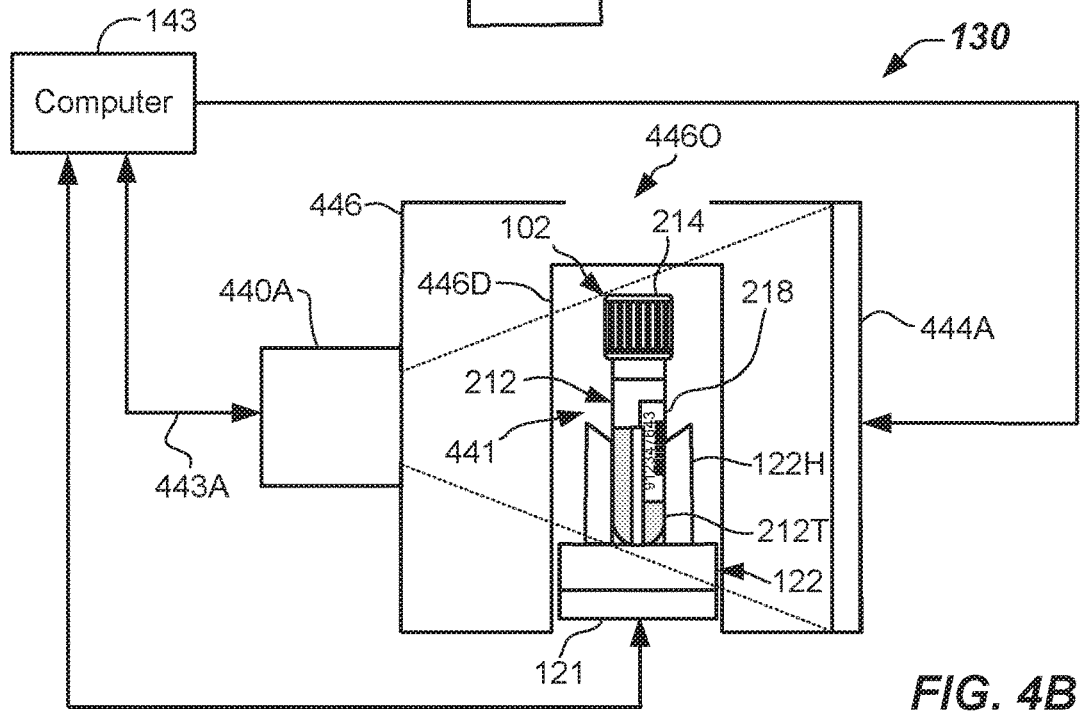
FIG. 4B illustrates a schematic side view of the quality check module of FIG. 4A according to one or more embodiments.

With reference to FIGS. 4A-4B, a first embodiment of a quality check module 130 is shown and described. Quality check module 130 may be configured and adapted to automatically quantify the specimen (e.g., quantity the serum or plasma portion 212SP, the settled blood portion 212SB, or both) prior to analysis by the one or more analyzers 106, 108, 110. Pre-screening in this manner allows for precise aspiration probe positioning, and determination that a sufficient amount (e.g., volume) of the liquid portion (e.g., serum or plasma portion 212SP) is available for the tests ordered, thus avoiding wasting valuable analyzer resources.

In addition to the characterization method wherein one or more of a physical location of LA, SB and/or SG, and/or determination of HSP, HSB, and/or HTOT, and/or a volume of the serum or plasma portion (VSP) and/or a volume of the settled blood portion (VSB) is quantified, other characterization methods may take place on the specimen 212 contained in the specimen container 102 at the quality check module 130. For example, in some embodiments, the characterization method may determine the presence or absence of an interferent (e.g., H, I, and/or L). The characterization method may determine the presence or absence of an artifact (e.g., clot, bubble, or foam). Furthermore, the quality check module 130 may be used to quantify the specimen container 102, i.e., quantify certain physical dimensional characteristics of the specimen container 102, such as the location of TC, HT, W, and/or Wi of the specimen container 102, and/or type of the cap 214, and/or a color of the cap 214.

Now referring to FIGS. 1, 4A and 4B, a first embodiment of a quality check module 130 may include multiple cameras 440A-440C. Three cameras 440A-440C are shown, but two or more, three or more, or even four or more cameras can be used. To minimize distortion, three or more cameras 440A-440C may be used. Cameras 440A-440C may be conventional digital cameras capable of capturing a digital image (i.e., a pixelated image), charged coupled devices (CCD), an array of photodetectors, one or more CMOS sensors, or the like. For example, the three cameras 440A, 440B, 440C are illustrated in FIG. 4A and are configured to take images from three different viewpoints. Each camera 440A, 440B, 440C may be a device capable of taking a digital image having an image size that may be about 2,560×694 pixels, for one example. In another example, the digital image may have an image size that may be 1,280×384 pixels. Other pixel densities may be used. Pixel as used herein may be a single pixel or a super-pixel (collection of closely-grouped multiple pixels). In some instances, processing of the images herein may be by processing superpixels to lower computational burden. Each camera 440A-440C may be configured and operable to take multiple lateral images of at least a portion of the specimen container 102 and at least a portion of the specimen 212. For example, the cameras 440A-440C may capture a part of the label 218 or cap 214 and part of the tube 212T. Eventually, from the multiple images, 2D data sets are generated, and a composite model of the specimen 212 in the specimen container 102 can be developed. The composite model may be a 3D model in some embodiments, and may be used to make final determinations about the specimen 212, or to confirm determinations made by using the 2D data from the images taken by the individual cameras 440A-440C.

In the embodiment shown, the plurality of cameras 440A-440C are arranged around the specimen 212 and configured to capture lateral images from multiple viewpoints. The viewpoints may be spaced so that they are approximately equally spaced from one another, such as about 120 degrees from one another, as shown, when three cameras 440A, 440B, 440C are used. As depicted, the cameras 440A-440C may be arranged around the edges of the track 121. Other arrangements of the plurality of cameras 440A-440C may be used. In this way, the images of the specimen 212 in the specimen container 102 may be taken while the specimen container 102 is residing in the carrier 122. The images may overlap slightly.

In one or more embodiments, the carriers 122 may be stopped at a pre-determined imaging location 441 in the quality check module 130, such as at a point where normal vectors from each of the cameras 440A-440C intersect each other. In some embodiments, a gate may be provided to stop the carriers 122, so that one or more good quality images may be taken at the imaging location 441. In other embodiments, the carriers 122 may include a linear motor configured to stop the carrier 122 at desired locations, as programmed, and to move the carrier 122 to the next station. In an embodiment where there is a gate at the quality check module 130, one or more sensors (like sensors 116) may be used to determine the presence of a carrier 122 at the imaging location 441 in the quality check module 130.

The cameras 440A-440C may be provided in close proximity to and trained or focused to capture an image window at the imaging location 441, i.e., an area including an expected location of the specimen container 102, wherein the specimen container 102 may be stopped so that it is approximately located in a center of the view window. As configured, the cameras 440A-440C can capture images that include portions of the serum or plasma portion 212SP, portions of the settled blood portion 212SB, and some or all of the cap 214, and the bottom-most portion of the tube 212T or another datum. Within the images captured, one or more reference datum may be present. The reference datum may aid in quantification of the specimen 212. Reference datum may be TC or the bottom-most portion of the specimen container 102, or a visible mark placed on the specimen container 102 in a known location, for example.

In operation, each image may be triggered and captured responsive to a triggering signal provided in communication lines 443A-443C that may be sent by the computer 143 when the carrier 122 is located at the desired location in the quality check module 130. Each of the captured images may be processed according to one or more embodiments of the method provided herein. In particular, HDR processing may be used to capture and process the images in order to characterize the specimen 212 and specimen container 102 with a high level of detail.

In more detail, multiple images may be captured of the specimen 212 (e.g., the specimen 212 separated by fractionation) at the quality check module 130 at multiple different exposures times, while illuminated by different spectra having different nominal wavelengths, and at different viewpoints. For example, each camera 440A-440C may take 4-8 or more images at different exposures times at the multiple wavelength spectra (or one or more wavelength ranges, such as when illuminating with white light).

In one embodiment, the multiple wavelength images may be accomplished using different spectral light sources 444A-444C. The light sources 444A-444C may back light the specimen container 102 (as shown in FIG. 4A-4B). Optionally, in another embodiment of quality check module 130A, light sources 444D-444F may front light the specimen container 102, such as by being arranged above, below, or to a side of the respective cameras 440A-440C, or be elsewhere located and illuminated as shown in FIGS. 4C-4D. A light diffuser and/or switchable bandpass light filter may be used in conjunction with the light sources 444A-444C or 444D-444F in some embodiments.

For example, to capture images at the first wavelength spectra, three red light sources (nominal wavelength of about 634 nm and a spectral bandwidth of about +/−35 nm) may be used to illuminate the specimen 212 from three lateral locations. The red illumination by the light sources 444A-444C may occur as the multiple images (e.g., 4-8 or more images) at different exposure times are captured by each camera 440A-440C. In some embodiments, the exposure times may be between about 0.1 ms and about 256 ms. Other exposure times may be used. Each of the respective exposure time images for each camera 440A-440C may be taken simultaneously and stored in memory.

In each embodiment, the quality check module 130, 130A may include a housing 446 that may at least partially surround or cover the track 121, and the specimen container 102 may be located inside the housing 446 during the image taking phase. Housing 446 may include one or more doors 446D to allow the carriers 122 to enter into and/or exit from the housing 446. In some embodiments, the ceiling may include an opening 446O to allow a specimen container 102 to be loaded into the carrier 122 by a robot including moveable robot fingers from above. In the case where front lighting is used, the quality check module 130A may include may include backstop walls 447 to provide improved image contrast. Backstop walls 447 may be any suitable color other than the expected range of color of the specimen 212. In some embodiments, a black colored material may be used.

Once the red illuminated images are captured in the embodiment of FIGS. 4A-4B, the red light sources 444A-444C may be turned off and another wavelength spectra of light, for example, green light sources 444A-444C may be turned on (nominal wavelength of about 537 nm and a spectral bandwidth of about +/−35 nm), and multiple images (e.g., 4-8 or more images) at different exposure times may be captured at that spectra by each camera 440A-440C. This may be repeated with blue light sources 444A-444C (nominal wavelength of about 455 nm and a spectral bandwidth of about +/−35 nm) for each camera 440A-440C. The different wavelength light sources 444A-444C may be accomplished via use of white lights with switchable bandpass filters, for example, or banks of different colored light sources, or light panels that can be selectively turned on and off, for example. Other means for providing different spectra (colored) lighting may be used.

In the optional embodiment, as best shown in FIGS. 4C and 4D, the specimen container 102 may be front lit in the quality check module 130A, such as by including light sources 444D, 444E, and 444F arranged adjacent to the cameras 440A-440C, i.e., above, below, to the side, or combinations, but on the same side of the specimen container 102 as the respective cameras 440A-440C. In this embodiment, the cameras 440A-440C may be digital color cameras having RGB sensor peaks of approximately 634 nm, 537 nm, and 455 nm, respectively, but wherein each of the RGB colors has a relatively wider wavelength range as compared to the discreet light sources used in the above embodiment in conjunction with the monochrome cameras.

In this alternate embodiment of the quality check module 130A, the light sources 444D, 444E, and 444F may each be white light sources. For example, the light sources 444D-444F may emit a wavelength range of between about 400 nm to about 700 nm and may be used to illuminate the specimen 212 from multiple lateral locations. Multiple images at different exposure times may be taken by each camera 440A-440C. Each white-light image taken by cameras 440A-440C may be stored in memory of the computer 143 and then separated into color components at multiple nominal wavelengths to provide the captured images at multiple spectra. For example, computer 143 may separate the images into at least three captured wavelengths between about 400 nm and about 700 nm. For example, RGB components at 634 nm, 537 nm, and 455 nm, respectively, may be separated out of the image data stored by the computer 143 to generate the multi-spectral, multi-time exposure captured images for each viewpoint. Images may be taken, as before, via signals from the computer 143 in communication lines 443A-443C.

For each of the above setups, all of these multiple images taken at multiple exposure times for each respective wavelength spectra (e.g., R, G, and B) may be obtained in rapid succession, such that the entire collection of images for the specimen 212 from multiple viewpoints may be obtained in less than about 2 seconds, for example. Other lengths of time may be used. For example, using the quality check module 130 of FIGS. 4A-4B, 4 different exposure images for each wavelength at three viewpoints using the cameras 440A, 440B, 440C and back lighting with RGB light sources 444A-444C will result in 4 images×3 colors×3 cameras=36 images. In another example using the quality check module 130A of FIGS. 4C-4D, 4 different exposure images at three viewpoints using the cameras 440A, 440B, 440C and front lighting with white light sources 444D-444F will result in 4 images×3 cameras=12 images. However, RGB images are then captured by the computer 143 by separating the white light images taken into the individual RGB components thereof. Thus, after separation, 36 images are also captured. The 2D image data may be stored in memory of the computer 143 and subsequently further processed thereby.

According to the method, the processing of the image data may first involve, for example, selection of optimally-exposed pixels from the multiple captured images at the different exposure times at each wavelength and for each camera 440A-440C, so as to generate optimally-exposed image data for each wavelength (e.g., RGB colored images) and for each camera 440A-440C. This is referred to as "image consolidation" herein. For each corresponding pixel, for each of the images from each camera 440A-440C, pixels exhibiting optimal image intensity are selected from each of the different exposure time images. In one embodiment, optimal image intensity may be pixels that fall within a predetermined range (e.g., between 180-254 on a scale of 0-255), for example. In another embodiment, optimal image intensity may be between 16-254 on a scale of 0-255, for example. If more than one pixel in the corresponding locations of two images (from one camera) is determined to be optimally exposed, the higher intensity of the two is selected. The result is a plurality of consolidated 2D color image data sets (e.g., R, G, B) for each camera 440A-440C where all of the pixels are optimally exposed (e.g., one image data set per wavelength spectra (e.g., R, G, and B) and per camera 440A-440C.

As part of the characterization method, a calibration process of the quality check modules 130, 130A may commence where reference images without a specimen container 102 or carrier 122 may be taken. In this way, computational burden may be minimized by subtracting tube background (the region outside of the specimen container 102) from each 2D image data set. Reference images for each exposure time and lighting condition (R, G, B, or white light) may be taken by the quality check module 130, 130A before carrying out the specimen quantification method.

For each 2D image data set including optimally-exposed pixels, a segmentation process may then be undertaken to generate one 2D consolidated image and identify a class for each pixel therein for each viewpoint. For example, the pixels may be classified as serum or plasma portion 212SP, settled blood portion 212SB, gel separator 313 (if present), air 212A, tube 212T, or label 218. Cap 214 may also be classified. Classification may be based upon a multi-class classifier (e.g., multi-class classifier 515 (FIG. 5A)) generated from multiple training sets. The multi-class classifier 515 may comprise a support vector machine (SVM) or a random decision tree, for example.

To carry out the pixel-level classification, first statistical data may be computed for each of the optimally-exposed pixels at the different wavelength spectra (e.g., R, G, B) for each camera 440A-440C to generate a 2D statistical data set. The statistical data may include mean values and variance values. The calculated statistical attributes encode specific properties of object classes and are thus used for discrimination between the different object classes by assigning class labels.

Once generated, each 2D statistical data set is normalized by exposure time and presented to, and operated on, by the multi-class classifier 515, which may classify the pixels in the image data sets as belonging to one of a plurality of class labels, such as 1—serum or plasma portion, 2—settled blood portion, 3—gel separator (if used), 4—air, 5—tube, 6—label, and possibly even 7—cap. From this, the pixels making up the liquid region (i.e., the serum and plasma portion 212SP) as well as the other regions may be identified/ classified. The result of the segmentation is consolidated 2D data sets, one data set for each viewpoint where all the pixels therein are classified.

The multi-class classifier 515 may be any suitable type of supervised classification model that is linear or non-linear. For example, the multi-class classifier 515 may be a support vector machine (SVM) that is either linear or kernel-based. Optionally, the multi-class classifier 515 may be a boosting classifier such as an adaptive boosting classifier (e.g., Ada-Boost, LogitBoost, or the like), any artificial neural network, a tree-based classifier (e.g., decision tree, random decision forests), and logistic regression as a classifier, or the like. A SVM may be particularly effective for classification between liquids and non-liquids, such as found in the analysis of the specimen 212 and specimen container 102. A SVM is a supervised learning model with associated learning algorithms that analyzes data and recognizes patterns. SVMs are used for classification and regression analysis.

Multiple sets of training examples are used to train the multi-class classifier 515, and then the image data sets are operated on by the multi-class classifier 515 and each pixel is classified as a result. The multi-class classifier 515 may be trained by graphically outlining various regions in a multitude of examples of specimen containers 102 having various specimen conditions, occlusion by label 218, levels of serum or plasma portion 212SP and settled blood portion 212SB, containing gel separator 313 or not, and the like. As many as 500 or more images may be used for training the multi-class classifier 515. Each training image may be outlined manually to identify and teach the multi-class classifier 515 the areas that belong to each class.

A training algorithm may build the multi-class classifier 515 that assigns pixels of any new specimen example into one of the classes. The SVM model represents examples as points in space that are mapped so that the examples of the separate classes are divided by a clear gap that is as wide as possible. New pixels from the image data sets may be mapped into that same space and predicted to belong to a particular class based on where they fall on the map. In some embodiments, SVMs can efficiently perform a non-linear classification using what is called a kernel trick (e.g., kernel-based SVM classifier), implicitly mapping their inputs into high-dimensional feature spaces. SVM, tree-based classifiers, and boosting are particularly preferred. Other types of multi-class classifiers may be used.

The results of the multi-class classifier 515 that are deemed to be of the class serum or plasma portion 212SP and/or settled blood portion 212SB may then be used to further quantify the specimen 212.

Figure 5A:
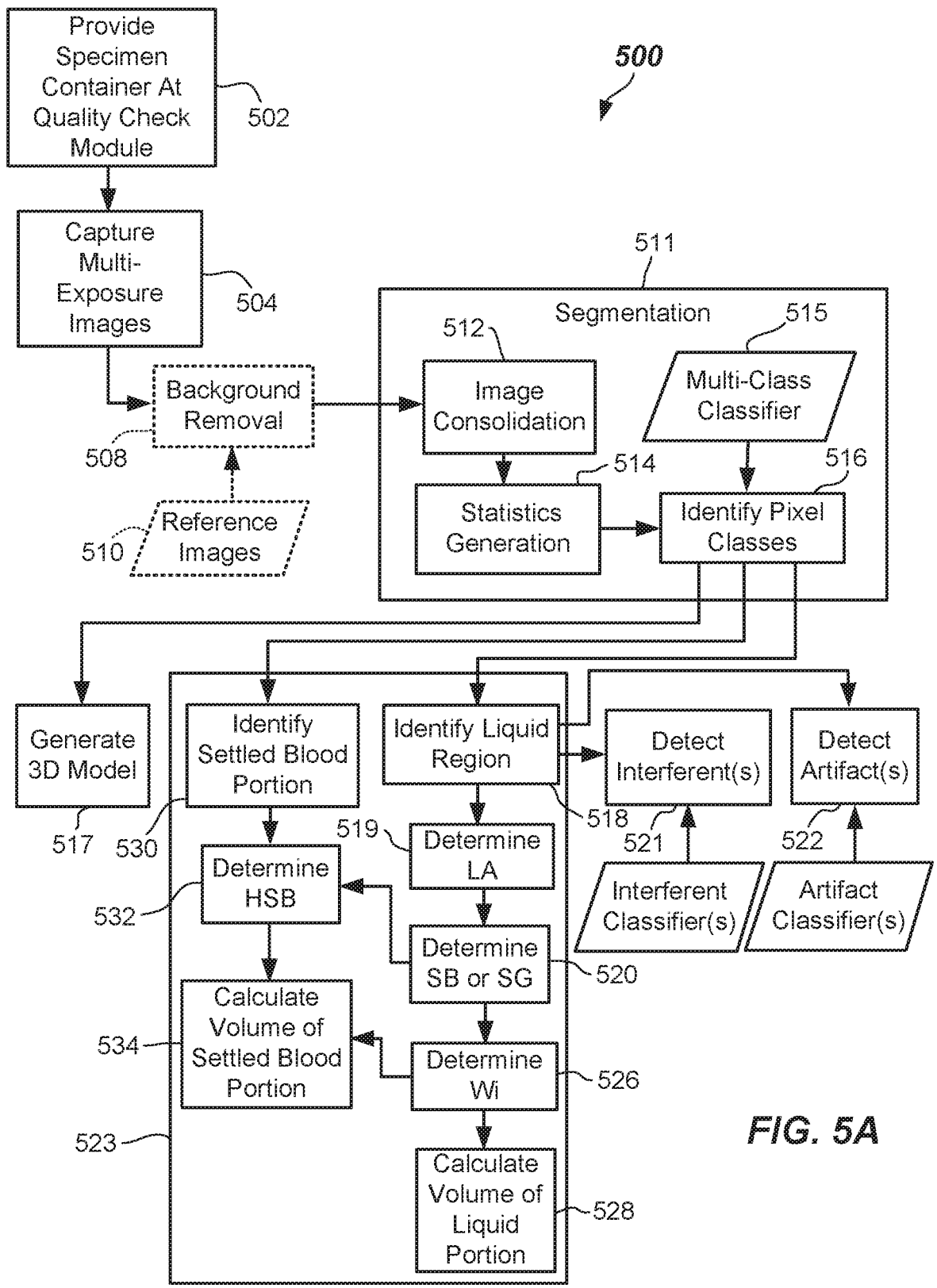
FIG. 5A illustrates a block diagram of components of a quality check module configured to characterize a specimen and specimen container according to one or more embodiments.
Figure 5B:
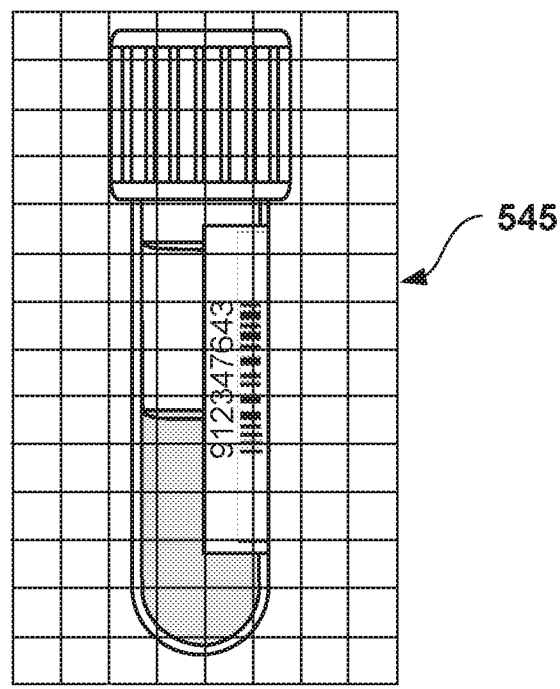
FIG. 5B illustrates a diagram of a specimen container image projected onto a virtual 3D voxel grid according to one or more embodiments.

A flow chart of the characterization method according to one or more embodiments is shown in FIG. 5A. First, the specimen container 102 including specimen 212, carried by carrier 122, is provided at the quality check module (e.g., quality check module 130 or 130A) in 502. Multiple images are captured at 504; the multiple images being multi-spectral images taken at multiple different exposures and at multiple different nominal wavelengths, and at multiple viewpoints, as described above. For quantification, the front lighted setup of quality check module 130A may be used. The multiple images taken may be stored in memory of the computer 143. From these images, the background may optionally be subtracted in a background reduction phase of 508 to lower computational burden. Background reduction may be accomplished by subtracting reference images previously taken in 510. A normalization of the data as between the various viewpoints may be undertaken in some embodiments.

After image capture in 504, and optional background reduction in 508, segmentation may be undertaken in 511. The segmentation in 511 may include an image consolidation that is undertaken in 512. During this image consolidation in 512, the various exposure time images at each color spectra (R, G, and B) and for each camera 440A-440C are reviewed pixel-by-pixel to determine those pixels that have been optimally exposed, as compared to a standard (described above). For each corresponding pixel location of the exposure time images for each camera, the best of any optimally-exposed pixel is selected for each spectra and camera 440A-440C and included in an optimally-exposed 2D image data set. Thus, following image consolidation in 512, there is produced one optimally-exposed 2D image data set for each color spectra (R, G, and B) and for each camera 440A-440C. The use of HDR processing may function to enrich the details of the images, especially with respect to reflections and absorption and this make segmentation more accurate.

Following image consolidation in 512 or possibly concurrent therewith, statistics generation may be undertaken in 514, where statistics are generated for each pixel, such as mean and covariance. This statistical data and the optimally-exposed 2D data sets are then operated on by the multi-class classifier 515 to identify the pixel classes present in the images data sets in 516. The final class for each pixel may be determined my maximizing confidence values for each pixel. For each pixel location, a statistical description may be extracted within a small super-pixel patch (e.g. 11×11 pixels). Each super-pixel patch provides a descriptor, which is considered in the training and evaluation process. Typically the classifiers operate on feature descriptors and use class labels for training and output class labels during testing/evaluation.

From this segmentation of 511, a consolidated 2D image data set is generated for each of the cameras 440A-440C, wherein each pixel in the consolidated image data set is given a classification as one of a plurality of class types in 516. Class types may be liquid (serum or plasma portion 212SP), settled blood portion 212SB, gel separator 313 (if present), air 212A, tube 212T, label 218, or even cap 214, for example. From this segmentation in 511, a 3D model may be generated and constructed in 517 from the consolidated 2D image data sets. The 3D model may be used to ensure a result that is consistent among the various viewpoints of the cameras 440A-440C is achieved.

For example, the liquid region (e.g., the serum or plasma portion 212SP) may be identified in 518. This may involve grouping all the pixels from class—serium or plasma portion 212SP, and then determining a location of the upper interface between liquid (serum or plasma portion 212SP) and air 212A (i.e., LA) in 519 for the consolidated 2D image data sets. This may be done for each viewpoint. Thus, a numerical value for LA may be calculated for each of the consolidated 2D image data sets by averaging the locations of the uppermost pixels classified as serum or plasma portion 212SP for each image. Any substantial outliers may be rejected and not used in the average. Previously performed pixel space to machine space (e.g., in mm) calibration may be accomplished by any known machine space to image space calibration technique and may be used to convert pixel space to machine space useable by the robot 124 or other robots used for aspiration. Furthermore, such calibration allows each of the images from the respective cameras 440A-440C to be coordinated to each other. The calibration may be accomplished by using any suitable target including known geometrical features positioned at a precisely known physical location at the imaging location 441 and imaging that target to coordinate and calibrate the cameras 440A-440C such that they are all focused and have a view window centered at the same imaging location 441. These numerical values for LA for each of the viewpoints can then be aggregated to identify a final value of LA that may be used in the 3D model. The aggregation may be by any suitable method to fuse the respective results of the viewpoints, such as by averaging the numerical values for LA for each of the viewpoints, for example. If one value is substantially below the other two, it may be discarded as an outlier.

Depending on whether a gel separator 313 is present (e.g., used), the quantification method then may determine the location of SB or SG (if gel separator is present) in 520 for each of the viewpoints. A numerical value for SB or SG for each viewpoint may be calculated in 520 by averaging or aggregating the locations of the lowermost pixels classified as serum or plasma portion 212SP in 516. A single value for SB or SG may be determined for the 3D model by averaging the SB or SG values for the viewpoints. From the locations of LA and SB or SG, the height of the serum or plasma portion HSP (FIGS. 2 and 3) may be determined via subtraction of the averages for LA and SB or SG.

Quantifying the liquid region (e.g., the serum or plasma portion 212SP) may further include determining an inner width (Wi) of the specimen container 102 in 526. In some embodiments, the outer width (W) may first be determined in 526 by identifying the pixels that are classified as tube 212T for each consolidated 2D image data set and subtracting the locations of corresponding ones of the pixels that are located on the lateral outside edges of the tube 212T (for example, as measured between LA and SB or SG), and then averaging the subtracted values for each viewpoint. A final value of W may be determined by averaging the W values from the viewpoints. Substantial outliers may be ignored. Wi may be determined from W by subtracting twice the wall thickness Tw. Tw may be an average wall thickness value that has been estimated for all specimen containers 102 and stored in memory or Wi may be obtained from a lookup table based upon the tube type determined based upon the outer width W and the height HT value for the specimen container 102.

From HSP, and Wi, the volume of the liquid region (e.g., the serum or plasma portion 212SP) may be determined using Eqn. 1 below in 528 for the 3D model.

$$VSP = HSP \times Pi/4 \, Wi^2 \qquad \text{Eqn. 1}$$

To quantify the settled blood portion 212SB, a similar method may be followed. The pixels corresponding to the class of settled blood portion 212SB may first be identified in 530. Depending on whether a gel separator 313 is present, height of the settled blood portion HSB for each viewpoint may be determined in 532 by locating the lowermost pixel of the settled blood portion 212SB in each consolidated 2D image data set and then subtracting either SB or BG. SB may be determined in 520. In the gel separator 313 is present, then BG may be determined for each viewpoint by averaging the lowermost vertical locations of pixels classified as gel separator 313. The lowermost pixel of the settled blood portion 212SB may be determined by finding the lowermost vertical dimension of the specimen container 102 and then subtracting the wall thickness Tw for each viewpoint. Wi may be determined in 526. A final value of HSB may be determined by averaging the respective HSB values of each of the viewpoints. From the final value of HSB and Wi, the volume of the settled blood portion 212SB may be determined in 534 using Eqn. 2 below for the 3D model.

$$VSB = (HSB \times Pi/4 \, Wi^2) - \tfrac{1}{2} Wi^2 + (Pi/24) Wi^3 \qquad \text{Eqn. 2}$$

Optionally, the various pixel classes of the consolidated 2D images for each of the viewpoints can be aggregated and mapped to reconstruct a 3D virtual voxel grid 345 surrounding the specimen container 102. Each pixel has a defined location in a 2D virtual grid, which than can be projected onto the 3D virtual voxel grid 345 from the three directions to generate the 3D model in 517. Grids from the 2D perspective are aligned with the 3D virtual voxel grid 345 based upon calibration information between the camera 440A-440C and pose for each viewpoint. Some redundancy (overlap) between the edge structures of each of the 2D grids may be present. The classes, having been assigned for each consolidated 2D image data set, may be grouped together for each viewpoint to form regions of: serum or plasma portion 212SP, settled blood portion 212SB, gel separator 313 (if present), air 212A, tube 212T, label 218, and possibly even cap 214, for each viewpoint. Voxels of each respective region are traversed onto the 3D virtual voxel grid 345, and if the classes are consistent between the adjacent viewpoints then the pixels in the overlapping region are assigned the common class.

As a result, the various regions are mapped to the 3D model and each region can be quantified using the calibration information and measurements from the 3D virtual voxel grid 345. The region locations of the 3D model may be used to determine where to place the aspiration probe tip so that no air 212A or settled blood portion 212SB or gel separator 313 are aspirated.

Once the liquid region is identified in 518, a presence of an interferent (e.g., H, I, and/or L) therein may be determined by operating on the 2D data sets of the liquid region with one or more interferent classifiers. In one embodiment, a separate classifier may be used for each of H, I, and L as described in co-pending and contemporaneously-filed provisional patent application entitled "METHODS AND APPARATUS FOR DETECTING AN INTERFERENT IN A SPECIMEN." It should also be recognized that averaged values may also be used to provide HIL index values (Havg, Iavg, Lavg) in 521 that may be used to provide interferent levels for the specimen 212 as an average of the multiple viewpoints. In this way, one consistent classification may be obtained for H, I, L or N for the 3D model.

At the quality check module 130 or 130A, a presence of an artifact (e.g., clot, bubble, and/or foam) may be determined by operating on the 2D data sets of the liquid region in 522 with one or more artifact classifiers. Each view may be used to generate an area for that particular view. The areas of the artifacts from the various viewpoints may then be used to determine an estimated volume of the artifact. Segmentation of the artifacts in the 2D images may be used to triangulate the artifact structures in 3D where volume may be derived from geometric computation.

An estimated volume of the artifacts may be subtracted from the volume VSP, so that a better estimate of the available liquid is provided. The various viewpoints can be used to project the location of the artifact onto the virtual 3D voxel grid and the dimensions from each 2D projection can be used to even better estimate the volume and 3D location of the artifact.

Accordingly, it should be apparent that the model-based quantification method 500 carried out by the quality check module 130 or 130A may result in a rapid quantification of the serum or plasma portion 212SP and/or the settled blood portion 212SB of the specimen 212. Final results and determinations can be aggregated across the multiple viewpoints and displayed as a 3D model.

Figure 6:
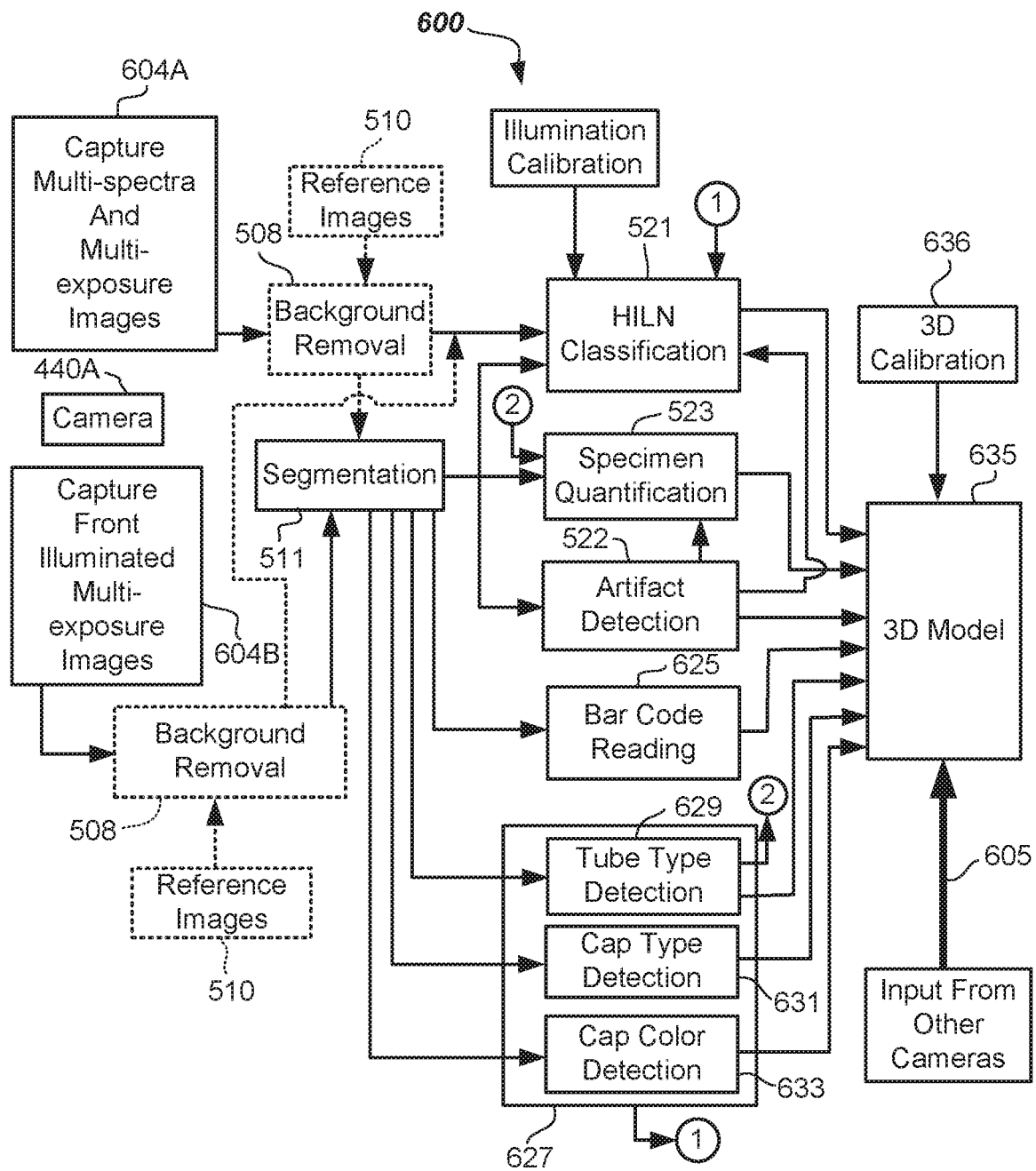
FIG. 6 illustrates a general block diagram of components of a specimen testing apparatus including capability to characterize a specimen and specimen container according to one or more embodiments.

FIG. 6 illustrates a flowchart of a characterization method 600 wherein the quantification of the specimen 212 is just one of the many items that may be characterized using the quality check module 130 or 130A. According to one or more embodiments of the method 600, images are captured, such as by multiple cameras (camera 440A is shown). However, other cameras 440B, 440C may be used to capture images from other viewpoints. The processing that will be described for the images captured on camera 440A is identical for the other cameras 440B, 440C at the other viewpoints and their inputs in line 605 may be used to develop a 3D model 635 of the specimen 212 used for final determinations or resolving any differences between the various viewpoints.

The images captured by camera 440A and the other cameras 440B, 440C may be multi-spectral (e.g., RGB) and multi-exposure images, as discussed above. In particular, multiple exposures (e.g., 4-8 exposures) may be taken for each wavelength of light used in 604A at each viewpoint. The respective images at each exposure for each camera 440A-440C may be obtained simultaneously using monochrome cameras and illumination by backlight light sources 444A-444C as described in FIGS. 4A-4B for quality check module 130. Optionally, front illuminated multi-exposure images using illumination with a white light sources 444D-444F may be obtained in 604B using a color camera for quality check module 130A. Optionally, more than one quality check module may be used. For example quality check module 130A may be used for quantification and quality check module 130 may be used for HILN detection. However, either one of the quality check modules 130 or 130A may be used for quantification and HILN detection.

The images may then be optionally processed in 508 to remove background using reference images 510, as described above in optional background removal method. The images may then be further processed to determine segmentation in 511 in the manner described above. In some embodiments, the images from front lit cameras 440A-440C (see FIGS. 4C-4D) from 604B may be best used for segmentation in 511. Likewise, any images captured in 604A may be best used for characterization of HILN in 521. However, clearly, images captured in 604A could be used for segmentation in 511, and images captured in 604B could be used for HILN detection in 521.

Identifying and quantification of the liquid in 523 in accordance with the methods described herein may also be carried out following segmentation in 511. Quantifying the liquid in 523 may involve the determination of certain physical dimensional characteristics of the specimen 212 such as a physical locations of LA, SB, SG, and/or BG, and/or determination of HSP (depth of the serum or plasma portion 212SP), HSB (depth of the settled blood portion 212SB), and/or HTOT, and/or a volume of the serum or plasma portion (VSP) in 528 and/or a volume of the settled blood portion (VSB) in 534 as discussed above. The inner width (Wi) may be obtained from the specimen container characterization in 526.

To provide an even closer measurement of the actual volume of serum or plasma portion 212SP that is available for testing, or simply to flag the presence of an artifact, an artifact detection method may be employed in 522 to identify a presence of clot, bubble, or foam in the serum or plasma portion 212SP. The respective estimated volume of the one or more artifacts present may be subtracted from the estimated volume of the serum or plasma portion VSP determined in 528 to obtain a better volume estimate. The 2D image data for each viewpoint may be processed in 522 using artifact classifiers to determine the presence or absence of an artifact in the serum or plasma portion 212SP. The pixels identified as being an artifact by artifact detection 522 may then be ignored in the quantification method described herein, but may also be ignored in the HILN classification in 521, so as not to skew the results. Detection of an artifact may also initiate a remediation in some embodiments. Artifact detection, such as provided in 521 is described in US Application filed contemporaneously herewith and entitled "Methods And Apparatus For Classifying An Artifact In A Specimen."

The results of the segmentation in 511 can also be used to identify the label 218, which may include the identifying information 215, such as a barcode. The barcode may be read in 625. Conventional barcode reading software may be used once the label 218 is identified in the segmentation in 511. If a particular image does not contain enough of the barcode to be read, the barcode can be read from, or in conjunction with the data from other images obtained from other viewpoints.

Further characterization of the specimen container 102 may also be accomplished according to the broader method 600 in 627. The characterization of the tube type in 629, cap type in 631 and cap color in 633 from the various viewpoints may be supplied and enable the generation of the 3D model in 635. The data from the various views may be compared so as to verify that the same characterization was achieved based on processing the images from each viewpoint (e.g., from cameras 440A-440C). If slightly different values are obtained, then the values may be averaged. All of the outputs from the HILN classification in 521, specimen quantification in 523, artifact detection in 522, and specimen container detection in 627 may be used to generate the 3D model 635. The 3D model 635 may be used for final decision making, characterization, and/or harmonization of the results from the various viewpoints (e.g., cameras 440A-440C). 3D calibration in 636 may include coordinating the positions of the various viewpoints to the 3D space. A 3D virtual voxel grid may be used for coordination of the 2D to 3D views.

Figure 7:
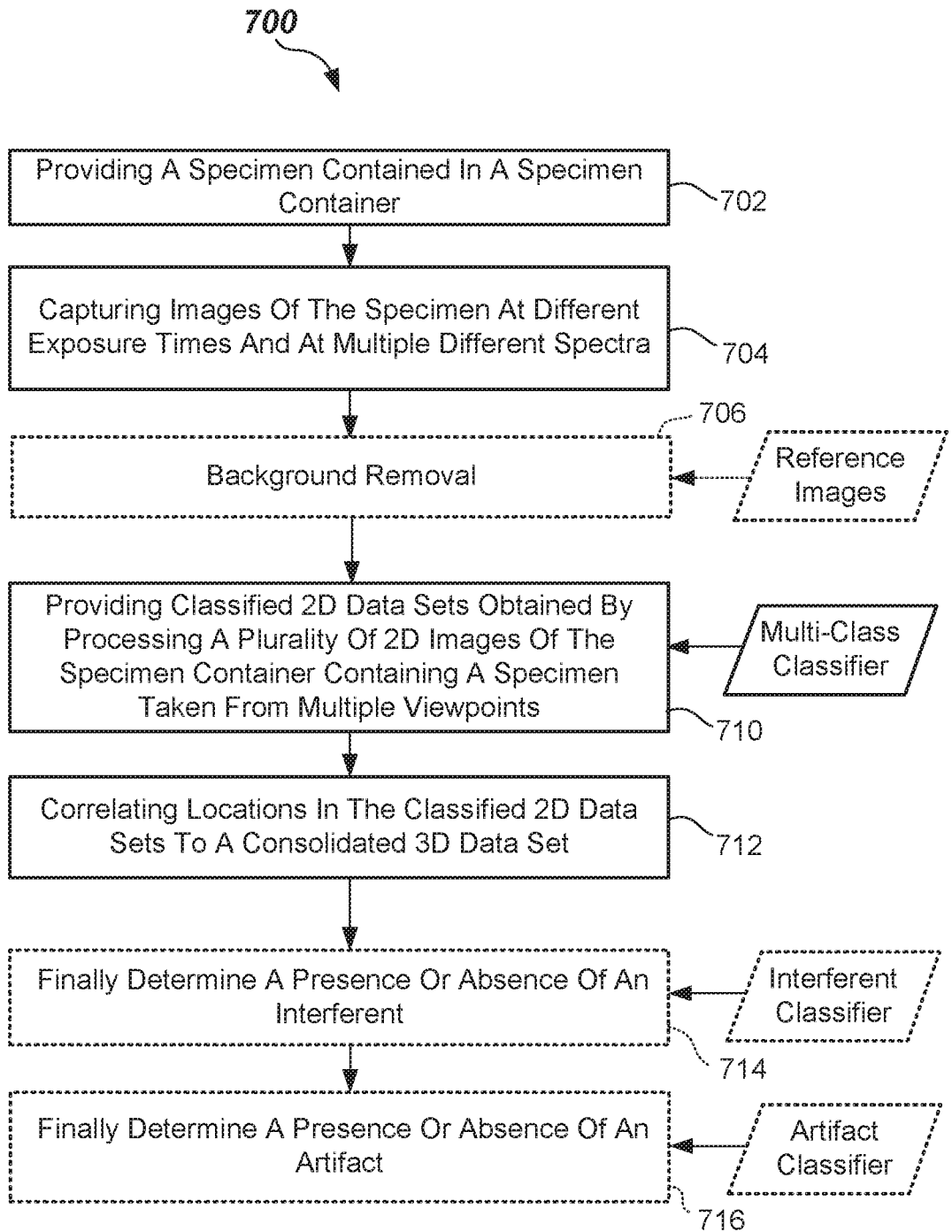
FIG. 7 is flowchart of a method of characterizing a specimen according to one or more embodiments.

FIG. 7 illustrates a flowchart of a method of characterizing a specimen contained within a specimen container according to one or more embodiments. The method 700 includes providing a specimen (e.g., specimen 212) contained in a specimen container (e.g., specimen container 102, such as a capped, blood collection tube) in 702. Next, the method 700 includes capturing images of the specimen container 102 containing specimen 212 at different exposures times and at different wavelengths in 704. For example, there may be 4-8 or more different exposures taken at different exposure times in some embodiments, but under the same lighting conditions. In one or more embodiments, some images may be captured using white light and using front lighting. In other embodiments, some images may be captured using a plurality of single-wavelength peak, narrow-band light sources, such as red, blue and green as backlit light sources 444A-444C. The white light images may be resolved into R, G, and B images as captured by the computer 143, as discussed above. In each instance, the images may be taken by multiple cameras 440A-440C from multiple viewpoints.

The method 700 may optionally include, as shown in 706, background reduction to subtract some of the background in order to lower computational burden. Background reduction may be accomplished by subtracting the images from corresponding reference images, which may be taken as part of a calibration process. Reference images may be taken at the same exposure times, wavelengths and lighting conditions as for the images of the specimen container 102, but may be captured without a specimen container 102 in the carrier 122. Background reduction 706 may also include normalization between the various viewpoints in some embodiments.

The method 700 includes, in 710, providing classified 2D data sets obtained by processing the plurality of 2D images of the specimen container containing a specimen taken from the multiple viewpoints. The classified 2D data sets being classified as: serum or plasma, settled blood portion, gel separator (if present), air, tube, and label.

The classified 2D data sets obtained by processing the plurality of 2D images may be obtained by selecting optimally-exposed pixels from the images at different exposure times at each wavelength to generate optimally-exposed image data at each wavelength. For each corresponding pixel location in each image at a particular wavelength, the best exposed pixel (not under or over exposed) may be selected. The optimal exposure range may be as discussed above. This selecting optimally-exposed pixels takes place in an image consolidation phase (e.g., image consolidation 512). Thus, for each of the RGB wavelengths, a data set of optimally-exposed pixels may be generated.

Next, the data set of optimally-exposed pixels may be classified to provide the classified 2D data sets. Classifying may be accomplished by computing statistical data of the optimally-exposed pixels at the different wavelengths to generate statistical data, and then operating on the statistical data of the optimally-exposed pixels to identify the various classes noted above. Other classes (e.g., cap 214) may also be identified by the classification.

The method 700 includes, in 712, correlating locations in the classified 2D data sets to a consolidated 3D data set. In this manner, a 3D model may be formed (e.g., constructed) based upon the classified 2D data set in 712 that have been obtained from the various viewpoints. Correspondence between the segmentation of the various viewpoints may be confirmed with the 3D model.

In some embodiments, the consolidated 3D model generated from the multiple 2D data sets that have been generated by the quality check module 130 or 130A may be used to provide a final result in regards to characterization of a presence or absence (normal—N) of an interferent (H, I, and/or L) in 714. If an interferent is detected, an interferent level may be assessed and reported based upon the consolidated data.

Likewise, the consolidated 3D model generated from the multiple 2D data sets may be used to provide a final result in regards to characterization of a presence or absence of an artifact (clot, bubble, foam) in 716. The results of the 3D model may be displayed or otherwise reported in any suitable manner or format, such as by displaying a 3D colored image on a display screen, providing a colored printout, displaying or providing a data sheet of measured values, or the like.

While the quality check modules 130 has been shown in FIG. 1 as being located such that the pre-screening is performed immediately after centrifugation on the centrifuge 125, it may be advantageous to include this feature directly on an analyzer (e.g., analyzer 106, 108, and/or 110) in some embodiments, or elsewhere. For example, stand-alone analyzers at remote station 132 that are not physically connected to the track 121 of the specimen testing apparatus 100 could use this technique and quality check module 130 to pre-screen specimens 212 prior to analysis. Furthermore, in some embodiments, the centrifugation may be performed prior to loading the racks 104 into the loading area 105, so that in some embodiments, the quality check module 130 may be located at the loading area 105 and the quality check can be carried out as soon as the robot 124 loads a specimen container 102 into a carrier 122. The quality check module 130, 130A are generally interchangeable and may be used at any desired location about the track or even as a stand-alone station that is visited by each specimen container 102 prior to being placed into the loading area.

While the invention is susceptible to various modifications and alternative forms, specific system and apparatus embodiments and methods thereof have been shown by way of example in the drawings and are described in detail herein. It should be understood, however, that it is not intended to limit the invention to the particular apparatus or methods disclosed but, to the contrary, the intention is to cover all modifications, equivalents, and alternatives falling within the scope of the invention.

What is claimed is:

1. A method of characterizing a specimen contained within a specimen container, comprising:
providing classified 2D data sets obtained by processing a plurality of 2D images of the specimen container containing a specimen taken from multiple viewpoints, the classified 2D data sets being classified as:
serum or plasma,
settled blood portion,
gel separator,
air,
tube, and
label;
correlating locations in the classified 2D data sets to a consolidated 3D data set; and
forming a consolidated 3D model based upon the consolidated 3D data set.

2. The method of claim 1, wherein the plurality of 2D images are taken at multiple different exposure times at each of the multiple viewpoints.

3. The method of claim 2, wherein the multiple different exposure times comprise between about 0.1 ms and about 256 ms.

4. The method of claim 2, wherein the plurality of 2D images are taken at multiple different spectra having different nominal wavelengths.

5. The method of claim 4, wherein the multiple different spectra comprise three or more wavelengths between about 400 nm and 700 nm.

6. The method of claim 4, wherein the multiple different spectra comprise wavelengths of about 634 nm+/−35 nm, about 537 nm+/−35 nm, and about 455 nm+/−35 nm.

7. The method of claim 4, wherein the classified 2D data sets are derived from optimally-exposed image data for each wavelength at multiple different exposure times.

8. The method of claim 1, wherein the plurality of 2D images represent a 360 degree view of the specimen container that is based on multiple lateral images, with each lateral image overlapping adjacent images.

9. The method of claim 1, wherein a number of the multiple viewpoints comprises 3 or more.

10. The method of claim 1, comprising computing statistics of optimally-exposed pixels at different wavelengths to generate statistical data.

11. The method of claim 10, wherein the computing statistics of the optimally-exposed pixels from optimally-exposed image data for the different wavelengths comprises calculating a mean value, a standard deviation, and/or covariance from a collection of corresponding pixels from each wavelength.

12. The method of claim 10, wherein selection of the optimally-exposed pixels comprises selection of pixels from the images that include intensities of between about 180-254 based upon a range of 0-255.

13. The method of claim 10, wherein a multi-class classifier is used to generate the classified 2D data sets.

14. The method of claim 13, wherein a multi-class classifier comprises a support vector machine or a random decision tree.

15. The method of claim 13, wherein the multi-class classifier is generated from multiple training sets.

16. The method of claim 1, wherein the consolidated 3D model is displayed or stored.

17. The method of claim 1, wherein the correlating locations in the classified 2D data sets to the consolidated 3D data set is based upon a virtual voxel grid for each classified 2D data set.

18. The method of claim 1, wherein the classified 2D data sets are further classified as cap.

19. A quality check module adapted to characterize a specimen and specimen container, comprising:
  a plurality of cameras arranged around the specimen container and configured to capture multiple images of the specimen container and specimen from multiple viewpoints, each of the plurality of cameras adapted to generate a plurality of 2D images taken at multiple different exposure times and multiple different wavelengths or one or more wavelength ranges;
  a computer coupled to the plurality of cameras and adapted to process image data from the plurality of 2D images, the computer configured and capable of being operated to:
  provide classified 2D data sets obtained by processing the plurality of 2D images taken from multiple viewpoints, the classified 2D data sets being classified as:
    serum or plasma portion,
    settled blood portion,
    gel separator (if present),
    air,
    tube, and
    label;
  correlate locations in the 2D data sets to a consolidated 3D data set; and
  form a consolidated 3D model based upon the consolidated 3D data set.

20. A specimen testing apparatus adapted to image a specimen contained within a specimen container, comprising:
  a track;
  a carrier on the track configured to contain the specimen container;
  a plurality of cameras arranged around the track and configured to capture a plurality of 2D images of the specimen container and specimen from multiple viewpoints, each of the plurality of cameras configured to generate a plurality of images at multiple different exposure times and multiple different wavelengths or one or more wavelength ranges;
  a computer coupled to the plurality of cameras and adapted to process image data from the plurality of 2D images, the computer configured and capable of being operated to:
  provide classified 2D data sets obtained by processing the plurality of 2D images taken from the multiple viewpoints, the classified 2D data sets being classified as:
    serum or plasma portion,
    settled blood portion,
    gel separator (if present),
    air,
    tube, and
    label;
  correlate locations in the 2D data sets to a consolidated 3D data set; and
  form a consolidated 3D model based upon the consolidated 3D data set.

* * * * *